United States Patent [19]
Zuck et al.

[11] Patent Number: 5,290,535
[45] Date of Patent: Mar. 1, 1994

[54] PROCESS FOR RECYCLING SALTCAKE

[75] Inventors: Dale A. Zuck; Gene J. Kulik, both of Phoenix; Henry C. Johns, Peoria, all of Ariz.

[73] Assignee: IMSALCO, Goodyear, Ariz.

[21] Appl. No.: 45,677

[22] Filed: Apr. 9, 1993

[51] Int. Cl.$^5$ .............................................. C01F 7/02
[52] U.S. Cl. ..................................... 423/627; 75/419; 75/671; 75/672; 423/600; 423/625
[58] Field of Search .................... 75/671, 419, 672; 423/600, 625, 627

[56]      References Cited
       U.S. PATENT DOCUMENTS

| | | | |
|---|---|---|---|
| 4,073,644 | 2/1978 | Papafingos et al. | 75/68 R |
| 4,252,776 | 2/1981 | Huckabay | 423/627 |
| 4,348,366 | 9/1982 | Brown | 423/627 |
| 4,368,070 | 1/1983 | Fracchia | 75/0.5 B |
| 4,569,723 | 2/1986 | Lyon et al. | 159/48.1 |
| 4,732,606 | 3/1988 | Köbele et al. | 75/24 |
| 4,752,328 | 6/1988 | Peterson | 75/24 |

OTHER PUBLICATIONS

"Experimental Processing of Salt Slags from an Aluminum Dross Furnace", Magyar, Kaplan, and Makar, Report of Investigations 8446, U.S. Dept. of Interior, Bureau of Mines (1980); pp. 1-26.

"Salt Slag Processing for Recycling", Unger and Beckmann, The Minerals, Metals, & Materials Society (1991); pp. 1159-1161.

Primary Examiner—Peter D. Rosenberg
Attorney, Agent, or Firm—Cahill, Sutton & Thomas

[57]      ABSTRACT

Saltcake generated by the aluminum industry is completely recycled through a process that simultaneously liberates the contained aluminum metal and dissolves the soluble salt fluxes to recover aluminum metal, aluminum oxide and salt fluxes by temperature controlled wet milling, rapid solids-brine separation and solar pond evaporation of the resulting clear brine. The temperature of the feedwater is 70° F. or less to retard the exothermic reaction of aluminum metal with water, thereby minimizing the loss of metal to oxidation and the evolution of undesirable gases. Low temperature is maintained by using process water at or below the desired temperature, by forcibly cooling the mill with ambient air, and by controlling transit time through the mill to avoid excessive grinding of the aluminum metal. Minimizing the production of fine aluminum particles reduces the total surface area of aluminum metal available for exothermic reacton with the water. Particle size is controlled by monitoring the aluminum metal product and slurry from the mill in order to adjust the feed rate of saltcake and water to the mill. Particle size control also permits maximum recovery of aluminum. The slurry from the mill is rapidly separated by filters and clarifiers into aluminum oxide and clear brine. The brine is then evaporated in solar pond(s) to recover salt fluxes.

13 Claims, 3 Drawing Sheets

PROCESS FOR RECYCLING SALTCAKE

BACKGROUND OF THE INVENTION

This invention relates to the production of aluminum and, in particular, to the recovery of aluminum, oxides, and soluble compounds from saltcake.

Companies producing aluminum can be divided between "primary" smelters producing aluminum from ore and "secondary" smelters producing aluminum from a combination of aluminum ingots and recycled scrap. Secondary smelters melt the aluminum ingots and scrap with a flux consisting of salts, such as sodium chloride, potassium chloride, cryolite ($Na_3AlF_6$), or mixtures thereof. The flux melts and floats on the molten aluminum, protecting the aluminum from the oxygen in the air. metallic aluminum combines readily with oxygen, even at room temperature. At the temperature of molten aluminum (1218° F.), the attraction for oxygen is very strong. Even with flux, a substantial fraction of the aluminum reacts to form aluminum oxide. In addition, aluminum globules are entrained in the flux, which is skimmed off as dross.

The dross has an aluminum content of fifteen to fifty percent by weight, the remainder being salts and oxides, and there are many processes for recovering this aluminum. Typically, the dross is heated with additional flux and the aluminum is removed by draining or other means, leaving behind what is known as "saltcake." Saltcake has essentially the same components as dross but in different proportions. Specifically, the recoverable aluminum content is typically four to six percent. At this level, it has not always been economically feasible to further process the saltcake for the recovery of aluminum or the other intrinsic value items, salt and aluminum oxide. The saltcake is raked off, or otherwise removed from, the molten aluminum, stored in suitable containers until cool, and dumped in a landfill as large chunks, e.g. typically twelve to forty cubic feet in volume.

Because of its high salt content, forty to fifty percent by weight, saltcake is ecologically undesirable although not toxic. The problem is that rainwater causes the salt to leach out of the cake, enter the ground, and eventually reach agricultural, industrial, or potable water supplies. A related problem is the shear bulk of the saltcake being sent to landfills. At this time, the amount of saltcake produced in the United States alone is approximately one million tons per year and the rate of production is likely to continue to increase, as it has for the past decade. Reducing or eliminating this material from landfills would significantly ease their burden and would be ecologically beneficial.

While there are commercially viable operations for recovering aluminum from dross, there are few stand alone, commercially viable operations in the world for recovering aluminum, oxides, and flux from saltcake. Part of the problem is the amount of salt, which is approximately half of the weight of the saltcake. Dissolving the salts with water requires large quantities of water and great amounts of energy to heat and then evaporate the water to separate and recover the salts. The cost of the water and energy, compared to the cost of a landfill, is part of the reason presently proposed techniques are not commercially feasible. A landfill is a relatively inexpensive outlet for saltcake.

Another part of the problem is the volume of saltcake to process. Many processes which have been developed in the laboratory or in pilot plants have not proven economically feasible in commercial applications. Increasing the number of facilities is not an answer because of the cost of construction and equipment which must be amortized. Landfills are (presently) an inexpensive alternative, unless salt is banned as a landfill material, as it has been in some areas. Finally, the brine itself is a problem because it is corrosive, eroding and clogging pumps, fittings, and pipes, requiring rigorous maintenance or replacement.

The processes proposed for recycling either dross or saltcake can be divided among those which leach first, those which grind first, and those which leach and grind simultaneously. U.S. Pat. Nos. 4,752,328—Peterson and 4,368,070—Fracchia are examples of the first type; U.S. Pat. No. 4,569,723—Lyon and 4,732,606—Kobele et al. are examples of the second type; and U.S. Pat. No. 4,073,644—Papafingos et al. is an example of the third type.

Leaching first is unsuited to recycling large quantities of saltcake since the chunks of saltcake have a low surface area to volume ratio, causing the leaching to take an unacceptably long time. The Peterson patent describes leaching the salt from one ton of saltcake in a little over nine days. With a million tons of saltcake being produced annually, nine days is an excessive time for processing one ton of saltcake.

Dry grinding is unsuitable since the particles produced are necessarily quite small. Dry grinding is dusty, causes high wear, and is more costly than wet milling.

Basically, all processes use screening to separate the aluminum from the oxides. The underlying assumption in screening is that the aluminum particles are larger than the oxide particles at a particular point in the process.

Dry grinding grinds some of the aluminum into fine particles, which are then collected with oxides and oxidized.

In accordance with the invention, simultaneous grinding and leaching is preferred. It has been found that control of particle/chunk size of the saltcake is important for the recycling process. Unlike the Papafingos et al. patent, the saltcake is in larger chunks going into a mill (four inches vs. less than one inch). Also unlike the Papafingos et al. patent, cold water, not hot water, is used for leaching the salts from the saltcake. The advantages of these, and other, differences from the prior art are discussed in the Detailed Description of the Invention.

In view of the foregoing, it is therefore an object of the invention to provide a process for recycling saltcake that is cost competitive with dumping the saltcake in a landfill.

Another object of the invention is to increase the yield of aluminum in the recycling of saltcake.

A further object of the invention is to provide a process for recycling large quantities of saltcake, on the order of one hundred thousand tons per site per year.

Another object of the invention is to provide a process for completely recycling saltcake into re-usable components, thereby obviating the need to store any residue in a landfill.

A further object of the invention is to minimize the oxidation of aluminum during the recycling of saltcake.

Another object of the invention is to improve the autogenous milling of saltcake.

A further object of the invention is to reduce the wear on pumps and other machinery handling brine.

SUMMARY OF THE INVENTION

The foregoing objects are achieved in the invention in which saltcake is reduced in size to a diameter of less than four inches. The −4 inch material is fed to a suitable grinding mill and water at ambient (70° F.) or lower temperature is added to form a brine slurry. The transit time through the mill is controlled to prevent aluminum particles finer than thirty mesh from being produced in significant quantity.

The controlled, wet milling reduces the amount of aluminum ground into fine particles, slowing oxidation and increasing yield. The use of unheated feedwater minimizes the oxidation of aluminum, and reduces the corrosion of equipment. Ambient air is blown into the mill as a supplemental cooling mechanism to reduce temperature build-up in the mill.

The brine slurry is withdrawn from the mill and is passed through concentric trommel screens to remove the aluminum. The outer trommel screen has a finer mesh than the inner trommel screen. Particles not passing through the inner screen are fifty to eighty percent aluminum, the balance being oxides, and are re-melted to recover the aluminum. Particles passing through the inner screen and not the outer screen are twenty-five to fifty percent aluminum.

The liquid passing through the outer screen is a slurry of oxides in brine. The slurry is pumped to a cyclone where oxides are separated by particle mass. The larger particles leave one outlet of the cyclone for deposition upon a vacuum belt filter, or equivalent device, for brine removal. The smaller particles are sent to a clarifier where flocculents are added to help remove the remaining oxides. The brine is then pumped to a settling pond to further remove any residual oxides and clarify the brine. The clear brine is then pumped to a solar evaporation pond where it is dried to form the composite salt NaCl-KCl, sold as flux. The oxides are sold as industrial filler, e.g. for paving material, or as a chemical additive for the production of Portland Cement, or as an abrasive.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
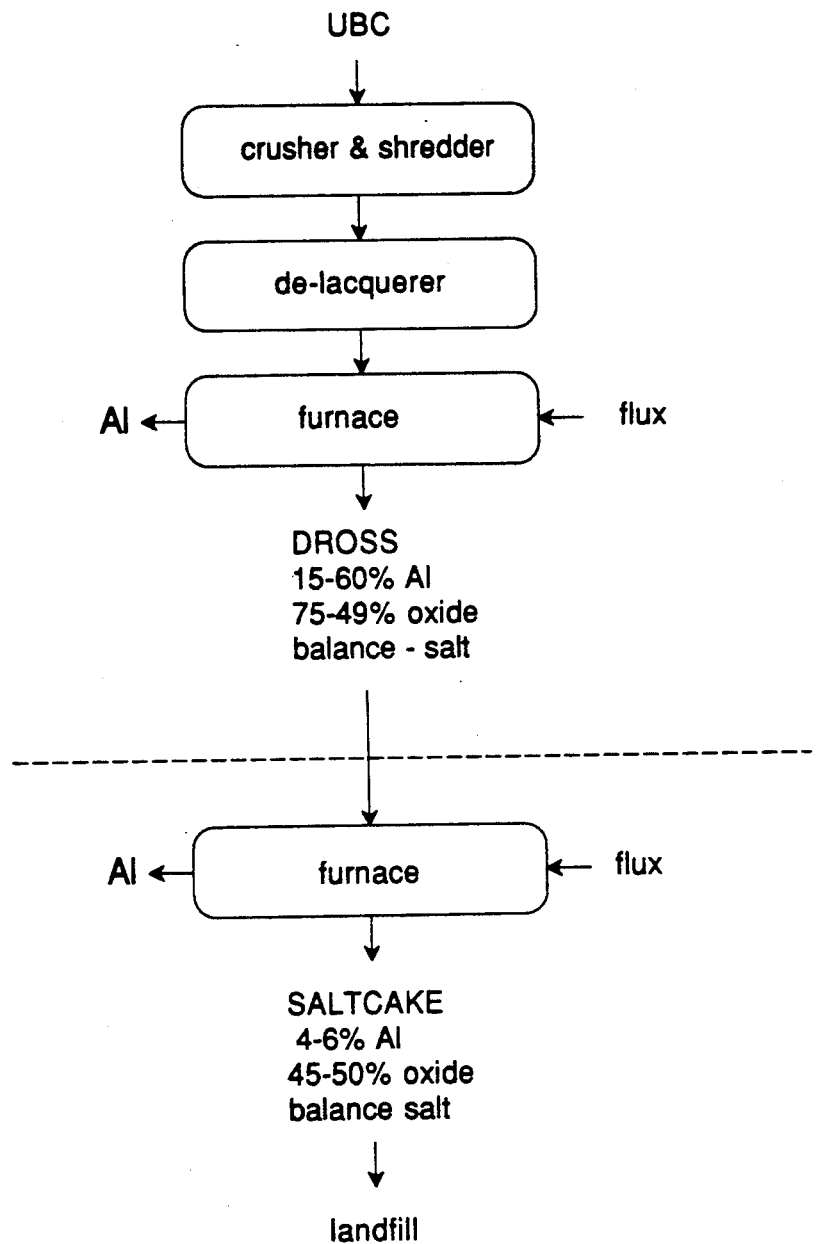
FIG. 1 is a flow chart of the production of dross and saltcake in the prior art.

FIG. 1 illustrates the production of dross and saltcake by a secondary smelter. In this process, aluminum scrap, such as from used beverage containers (UBC) are crushed, shredded, de-lacquered, and fed to a reverberatory furnace with flux. The flux is typically fifty percent potassium chloride and fifty percent sodium chloride, the eutectic mixture of these salts. The flux melts, forming a viscous liquid on the surface of the aluminum, protecting the aluminum from the oxygen in the air. Even with the flux, some aluminum oxidizes from oxygen trapped in the crushed aluminum. In addition, some of the aluminum is entrained in the dross as globules of metallic aluminum. The dross from the furnace is typically between fifteen and fifty percent by weight aluminum, seventy-five to forty-nine percent aluminum oxide and the balance salt.

The dross is typically recycled by returning it to a rotary furnace with additional flux. The flux added in this step is typically seventy percent sodium chloride and thirty percent potassium chloride. The aluminum is tapped from the furnace and the flux is removed from the furnace, e.g. by raking, skimming, or pouring into containers in which it is permitted to cool. The spent flux from recycling dross is referred to as "saltcake" and has a recoverable aluminum content of four to six percent.

Figure 2:
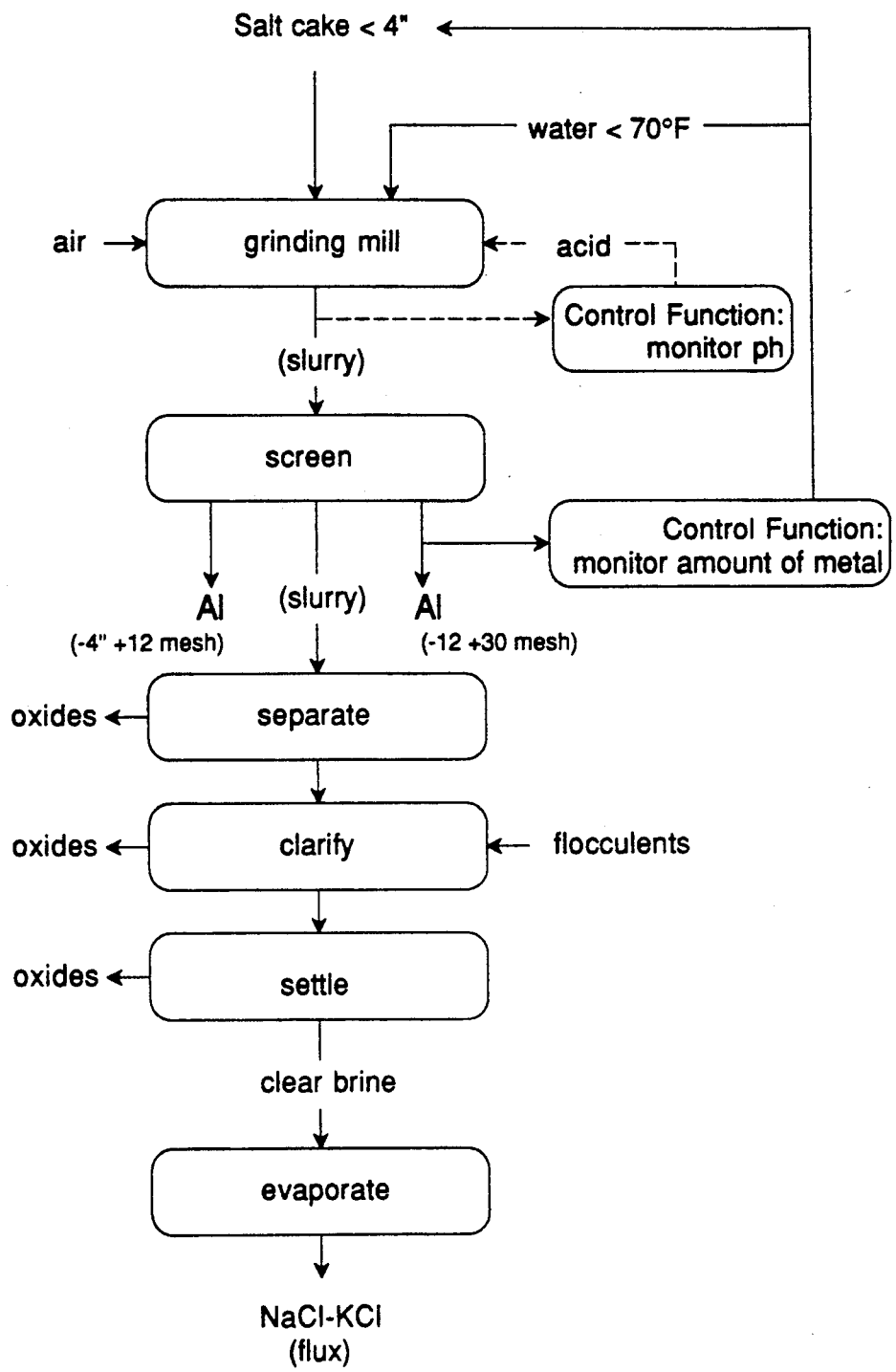
FIG. 2 is a flow chart of a saltcake recycling process in accordance with the invention.

FIG. 2 is a flow chart of a process in accordance with the invention for recycling saltcake. In the first step, the saltcake is crushed, for example in a hammer mill, to less than four inches in diameter. As used herein, "diameter" refers to the smallest diameter across a chunk, which has an irregular shape and different diameters depending upon the orientation of the chunk.

Chunks having a diameter less than four inches are separated by screening, e.g. with a grid, punch plate, or grizzly. The particular process by which chunks are separated is not critical to the invention. Material passing through a screen is denoted by a minus sign (−) and material not passing through a screen is denoted by a plus sign (+). Thus, the chunks selected by screening are less than four inches in diameter. The chunks larger than four inches are returned to the crusher for further size reduction.

The −4 inch material is fed to a grinding mill having a rotating cylinder to which unheated water is also added. The opening at the end of the cylinder through which the chunks are fed has a smaller diameter than the opening at the other end of the cylinder from which the slurry is removed. This provides a natural flow along the length of the cylinder as the material is ground into finer particles.

If no grinding media is added, the material grinds itself by continuously falling on itself as the cylinder is rotated about its longitudinal axis and the mill is referred to as an autogenous mill. If grinding media, such as iron or ceramic balls are added to the mixture, then the mill is referred to as a ball mill. If rods are added, the mill is referred to as a rod mill. Any of these mills is suitable for use in the invention.

The water is fed at a temperature of 70° F. or less in order to reduce the chemical reaction between the aluminum particles and the water. Aluminum reacts with oxygen even at room temperature and is sufficiently reactive to remove oxygen from water molecules, releasing hydrogen gas. Since the oxidation of aluminum is an exothermic reaction, the water is heated by the reaction between the aluminum and the water. This reaction is slowed in accordance with the invention by supplying water at a temperature of 70° F. or less. In addition, the mill is force cooled with ambient air to provide additional cooling. The amount of air is not critical, replacing the air in the mill once every two to three minutes has been found effective.

Wet-milling the chunks of saltcakes produces fewer fine particles than dry milling and the reaction between the aluminum and the water is less pronounced because of the decreased surface area of exposed aluminum. All three of these factors (unheated water, air cooling, and larger particles) contribute to a reduced temperature in the mill and, in particular, to a reduced oxidation of aluminum. Thus, the process in accordance with the invention has a higher yield of aluminum than processes of the prior art.

The production of fewer small particles of aluminum is further enhanced by controlling the transit or retention time of the mill. Transit time is primarily controlled by the feed rates of the saltcake and water to the mill. Other parameters affecting retention time are rotational speed, mill volume, liner design, mill gradient, and grinding media type and hardness. Most of these parameters are selected at time of equipment purchase and are relatively fixed operational controls for a given unit. For example, mill gradient is determined by the difference in diameter of the entry and exit ports and the pitch of the longitudinal axis of the cylinder. These are not readily modified after the mill is installed.

In the mill, as the salt is dissolved by the water, the ph of the water increases, becoming more alkaline, due to the NAOH and KOH being formed. It has been found that reducing the ph also reduces the oxidation of aluminum. Adding boric acid, for example, to maintain a ph in the range of 8–9.6 further reduces the oxidation of aluminum. A neutral (ph=7) slurry is undesirable because of the quantity of boric acid required to produce a ph of 7 and because the salt recovered must be reasonably pure for recycling as flux.

The preferred rotational speed of the cylinder is in the range of 50–80 percent of critical speed. A number of factors affect selection of rotational speed, such as the feed rates of saltcake and water and the proportion of large chunks ($-4''+1''$) of saltcake. The type of cylinder also affects the rotational speed. For example, a cylinder having a smooth inner surface or liner is rotated faster than a cylinder having a liner with lifters (internal ramps or steps for lifting the material as the cylinder rotates). These factors are known per se to those in the milling art and an operator can readily determine empirically the optimum speed within the preferred range. Critical speed is the speed at which centrifugal force on material in the cylinder is equal to or greater than the force of gravity.

The water and soluble components of the saltcake combine in the mill to form a brine in which the insoluble particles are kept in suspension by the rotation of the cylinder. Saltcake and water are fed continuously to the cylinder and a portion of the slurry is continuously withdrawn. The slurry goes to a pair of concentric trommel screens, the outer screen having a finer mesh than the inner screen. In one embodiment of the invention, the outer screen was 30 mesh and the inner screen was 12 mesh.

Particles having a diameter from $-4$ inches to $+12$ mesh are fifty to eighty percent by weight metallic aluminum, and are recycled in the same manner as dross. The particles are melted in a furnace and the aluminum is cast into RSI (recycled secondary ingot) sows. RSI is used, for example, in the automotive industry.

Particles passing through the inner screen and not the outer screen, e.g. $-12$ mesh to $+30$ mesh, are twenty-five to fifty percent metal and are used as exothermics by the steel industry.

The amount of aluminum recovered from the trommel screens, especially the amount of $-12$ mesh $+30$ mesh particles of aluminum, is monitored to control the feed rate of saltcake and water to the cylinder in the mill for optimum aluminum production (maximum total aluminum and minimum $-30$ mesh aluminum particles).

The brine passing through the outer screen is a slurry of fine particles of oxides, e.g. $-30$ mesh, and the particles are removed in a series of separation operations to produce a clear brine. The oxides are first separated in a cyclone separator and the overflow is passed to a clarifier, wherein flocculents are added to help remove the oxides from the brine. The overflow from the clarifier is sent to a settling pond for removing extremely fine oxide particles. The output from the settling pond is a clear brine which is sent to a solar pond for evaporation.

The brine is a mixture of sodium chloride and potassium chloride in the same ratio as the original flux and the chlorides uniformly co-precipitate back to a suitable flux as the water evaporates. Thus, the flux is recovered through standard solar evaporation practices and sold to aluminum smelters where it is re-used for scrap melting.

Figure 3:
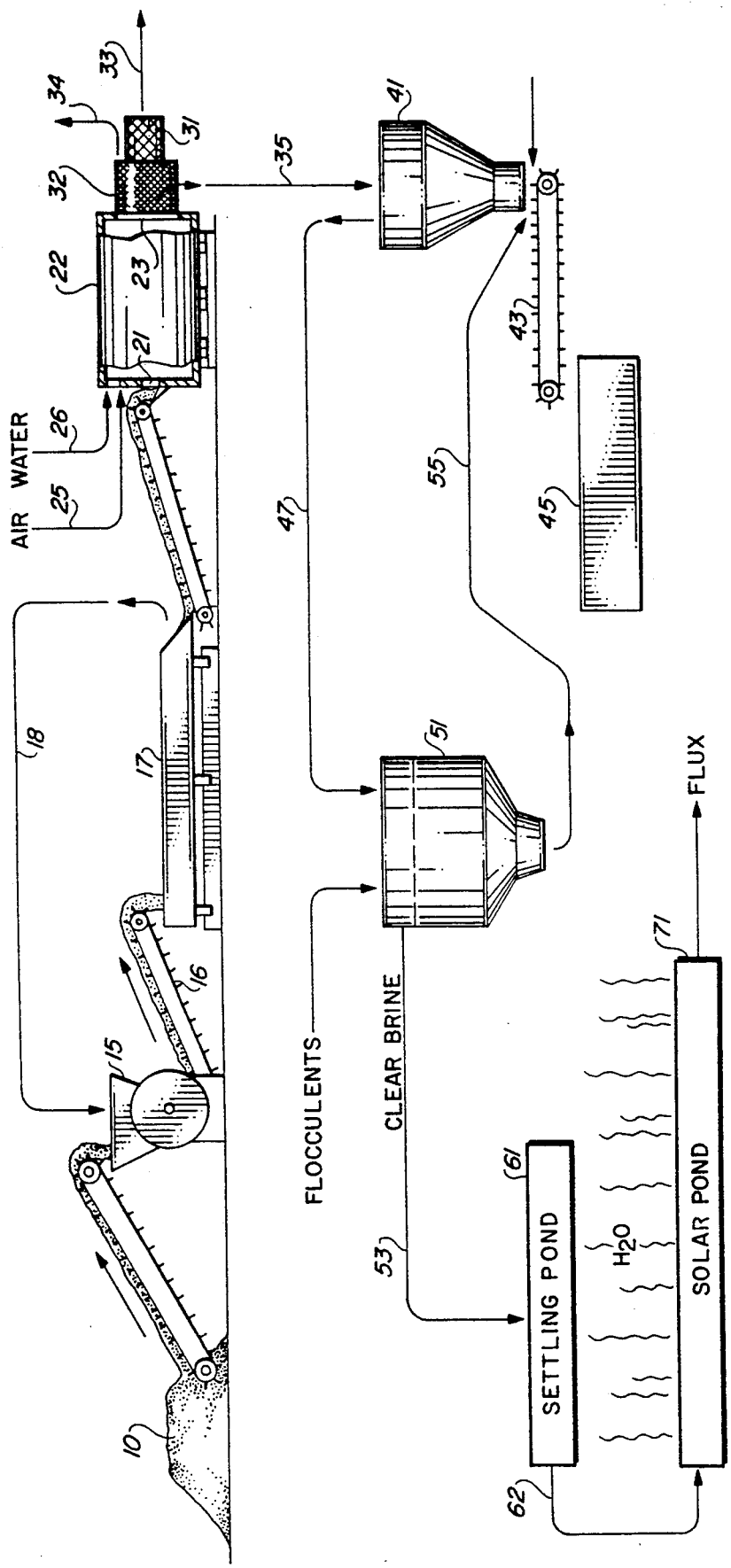
FIG. 3 is a schematic flow chart showing the apparatus and process steps for recycling saltcake in accordance with the invention.

FIG. 3 illustrates apparatus for recycling saltcake into salable components. Saltcake 10 is fed to impactor 15 where it is broken up into chunks and fed, by way of belt 16, to grizzly 17 for screening. Grizzly 17 passes chunks having a diameter less than four inches to feed port 21 of cylinder 22. Chunks of metal not passing through grizzly 17 are hand collected. Other material not passing grizzly 17 is fed back to impactor 15 as indicated by line 18. The material grinds on itself as cylinder 22 is rotated by a suitable source of power (not shown). As indicated by arrows 25 and 26, air and water are also supplied to input port 21. As described above, the water is unheated, e.g. at 70° F. or cooler. The air is supplied to cool the materials in process within cylinder 22.

Exit port 23 has a larger diameter than input port 21 and material is fed continuously to input port 21. Thus the chunks of saltcake grind on themselves as they drift through the cylinder toward exit port 23. By varying the rotational speed of cylinder 22, the amount of saltcake supplied to input port 21 and/or the amount of water supplied to input port 21, one controls the transit time of saltcake through cylinder 22 and thereby controls the particle size of the aluminum and oxides.

In one embodiment of the invention, eighteen tons per hour of saltcake are supplied to a mill along with one hundred and fifty gallons of water per minute. The mill rotates at a speed of approximately eighteen revolutions per minute. These numbers are approximate since the composition of the saltcake, particularly the amount of entrained aluminum, can vary the properties of the saltcake such that more or less saltcake or more or less water must be added to the mill. In addition, the saltcake may have been produced in relatively flat sheets, in which case relatively few large diameter chunks are fed to the mill. One can add grinding media, as in a ball mill, or decrease the transit time to compensate for the fewer large chunks from the sheets of saltcake.

Connected to exit port 23 are trommel screens 31 and 32. Trommel screen 31 has a coarser mesh than trommel screen 32. In one embodiment of the invention, trommel screen 31 was 12 mesh and trommel screen 32 was 30 mesh. Material not passing through screen 31, as indicated by arrow 33 are particles having a diameter $-41$ to $+12$ mesh. These particles are typically fifty to eighty percent metal with some oxide and are reheated to produce recycled secondary ingots, as described above. The particles passing through screen 31 and not screen 32, indicated by arrow 34, are −12 mesh +30 mesh particles having approximately twenty-five to fifty percent aluminum content. These are also recovered and sold. The amount of aluminum metal recovered, especially the amount of −12 mesh +30 mesh particles, is monitored by the mill operator who controls the feed rates of water and saltcake. The mill is operated to favor total aluminum metal production, minimizing the amount of −30 mesh metal in the slurry.

The liquid passing through screen 32 is a turbid slurry of insoluble components (−30 mesh) and brine. The slurry is pumped through a pipe represented by line 35 to cyclone separator 41. The cyclone underflow is typically sixty percent solids and forty percent moisture and is sent to vacuum belt filter 43 for further water removal to produce a filter cake. Belt filter 43 removes approximately twenty percent of the moisture from the particles. Optionally, the particles are further rinsed with water to assure complete removal of chlorides. The particles are then collected in bin 45 and are essentially all aluminum oxide.

The cyclone overflow is fed to clarifier 51 through a pipe represented by line 47. The brine in pipe 47 has had approximately eighty percent of the solids removed. Typically, the brine in clarifier 51 includes fine particles which did not separate out in cyclone separator 41. Flocculents are added to the brine in clarifier 51 to trap the fine particles. Flocculents are typically an aqueous solution of polymer and are commercially available from a number of sources. The underflow from clarifier 51 is fed back through pipe 55 to vacuum belt filter 43. Any flocculent material in the underflow is minimal and soon decomposes.

The overflow from clarifier 51 flows by gravity through a pipe represented by line 53 to settling pond 61. At settling pond 61, any fine particles which may remain settle out and a clear brine is pumped through a pipe represented by line 62 to solar pond 71. At solar pond 71 the water evaporates leaving the composite salt NaCl-KCl, which is sold as flux to smelters.

The apparatus illustrated in FIG. 3 permits one to recycle saltcake in a process cost competitive with dumping the saltcake in a landfill. The yield of aluminum is increased by controlling particle size in cylinder 22 to minimize the amount of aluminum oxidized in the recycling process. A prototype system has been run at approximately eighteen tons per hour which, if continued twenty-four hours per day, three hundred days per year, would process in excess of one hundred thousand tons of saltcake per year. All of the products of the recycling process are reusable and salable, contributing to the commercial viability of the process. Purchased energy is minimal because the system uses water at ambient temperature, solar evaporation, and gravity feed wherever possible. Because of the lower temperature of the brine, the separators and piping are subject to less corrosion and wear, requiring less frequent maintenance or replacement.

Having thus described the invention, it will be apparent to those of skill in the art that various modifications can be made within the scope of the invention. For example, flat screens could be used instead of concentric trommel screens. Although the invention was described in terms of a continuous milling operation, the invention can be used for batch processing of saltcake as well. In its preferred embodiment, the invention is described in terms of recovering aluminum from saltcake. It is understood by those of skill in the art that saltcake is also a by-product of refining other metals, such as magnesium and zinc. Saltcakes of these and other metals can be recycled by the process of the invention.

We claim:

1. A process for recycling saltcake, wherein said saltcake is in chunks larger than four inches in diameter and includes insoluble and soluble components, wherein the insoluble components include aluminum metal and aluminum oxide and the soluble components include chloride salts of sodium and potassium, said process comprising the steps of:
   breaking the saltcake into chunks having a diameter of four inches or less;
   feeding said chunks to a mill having a rotatable cylinder;
   feeding unheated water to said cylinder;
   rotating said cylinder to form a slurry of insoluble components in a brine of soluble components and to liberate entrained aluminum metal;
   withdrawing said slurry from said cylinder; and
   separating the aluminum metal from the aluminum oxides and brine.

2. The process as set forth in claim 1 wherein said water has a temperature of 70° F. or less as it is added to said cylinder.

3. The process as set forth in claim 1 and including the step of:
   cooling the contents of said cylinder by forcing air into said cylinder.

4. The process as set forth in claim 3 wherein said water has a temperature of 70° F. or less as it is added to said rotating cylinder.

5. The process as set forth in claim 1 wherein said feeding and rotating steps are continuous.

6. The process as set forth in claim 1, wherein said separating step comprises the step of:
   feeding said slurry to a pair of trommel screens for separating said aluminum from said brine.

7. The process as set forth in claim 1 and further comprising the steps of:
   separating said oxides from said brine; and
   feeding said brine to a solar pond to evaporate the water from said brine, leaving a salt deposit.

8. The process as set forth in claim 1 wherein said cylinder is rotated at 50–80 percent of critical speed.

9. A process for completely recycling saltcake to recover aluminum metal, aluminum oxide, and salt flux, said process comprising the steps of:
   breaking the saltcake into chunks having a diameter of four inches or less;
   feeding said chunks to a mill;
   feeding water at a temperature of 70° F. or less to said mill;
   operating said mill to liberate entrained aluminum metal and to form a slurry of aluminum metal and aluminum oxide in a brine of salt flux;
   removing said slurry from said mill;
   separating said aluminum metal from said aluminum oxide and brine;
   separating said aluminum oxide from said brine; and
   evaporating said brine to recover said flux.

10. The process as set forth in claim 9 and including the step of:
    cooling said mill with ambient air.

11. The process as set forth in claim 9 wherein said feeding steps and said operating step are continuous.

12. A process for recycling saltcake to recover insoluble and soluble components of the saltcake, wherein the insoluble components include metal and metal oxide and the soluble components include chloride salts, said process comprising the steps of:

breaking the saltcake into chunks having a diameter of four inches or less;

feeding said chunks to a mill having a rotatable cylinder;

feeding unheated water to said cylinder;

rotating said cylinder to form a slurry of insoluble components in a brine of soluble components and to liberate entrained metal;

removing said slurry from said mill; and separating the metal from the metal oxides and brine.

13. The process as set forth in claim 12 and further comprising the step of:

maintaining the ph of said brine between 8 and 9.6 while rotating said cylinder.

* * * * *